(12) United States Patent
Langhans et al.

(10) Patent No.: US 7,186,335 B2
(45) Date of Patent: Mar. 6, 2007

(54) PROCESS AND DEVICE FOR BIOLOGICAL TREATMENT OF A SUSPENSION IN A BIOREACTOR WITH INTEGRATED HYDRAULIC TOP SCUM TREATMENT

(75) Inventors: Gerhard Langhans, Dresden (DE); Matthias Herms, Dresden (DE); Thomas Buechner, Kreischa (DE)

(73) Assignee: Linde-KCA-Dresden GmbH, Dresden (DE)

( * ) Notice: Subject to any disclaimer, the term of this patent is extended or adjusted under 35 U.S.C. 154(b) by 125 days.

(21) Appl. No.: 10/883,961

(22) Filed: Jul. 6, 2004

(65) Prior Publication Data

US 2005/0029189 A1   Feb. 10, 2005

Related U.S. Application Data

(63) Continuation-in-part of application No. 10/740,690, filed on Dec. 22, 2003, now abandoned.

(30) Foreign Application Priority Data

Dec. 23, 2002   (DE) ................................ 103 58 399

(51) Int. Cl.
*C02F 3/00*   (2006.01)

(52) U.S. Cl. ...................... 210/194; 220/197; 220/220; 220/525; 220/800

(58) Field of Classification Search ................ 210/800, 210/220, 194, 197, 525
See application file for complete search history.

(56) References Cited

U.S. PATENT DOCUMENTS

| | | |
|---|---|---|
| 5,089,118 A | 2/1992 | Mahoney et al. |
| 5,409,610 A | 4/1995 | Clark et al. |
| 5,942,116 A | 8/1999 | Clark et al. |

*Primary Examiner*—Chester T. Barry
(74) *Attorney, Agent, or Firm*—Millen, White, Zelano & Branigan, P.C.

(57) ABSTRACT

A process and a device for biological treatment of a suspension in a bioreactor, wherein the suspension is circulated, at least some of the suspension is routed through a vertically aligned guide zone in the bioreactor so that a vertical flow of the suspension is produced. The top scum in the area of the suspension fill level is controlled by feeding a fluid, especially in the form of a free liquid jet, into the bioreactor via at least one nozzle at the fill level, such that the surface of the suspension and/or the top scum floating on the surface of the suspension is forced into rotary flow.

20 Claims, 3 Drawing Sheets

PROCESS AND DEVICE FOR BIOLOGICAL TREATMENT OF A SUSPENSION IN A BIOREACTOR WITH INTEGRATED HYDRAULIC TOP SCUM TREATMENT

CROSS REFERENCE TO RELATED APPLICATION

This application is a continuation-in-part of U.S. Ser. No. 10/743,319, filed Dec. 23, 2003 and claims priority to German Application 103 58 399.8, filed Dec. 11, 2003.

This application is also related to a concurrently filed application entitled "Process And Device For Biological Treatment Of A Suspension In A Bioreactor With Integrated Hydraulic Bottom Layer Removal" Ser. No. 10/883/977 by the identical inventors.

The invention relates to a process for biological treatment of a suspension in a bioreactor in which to circulate the suspension, at least some of the suspension is routed through a vertically aligned guide zone so that a vertical flow of at least a portion of the suspension is produced, which flow extends into the area of the suspension fill level or proceeds from this area. The invention also relates to a device for carrying out the process.

Processes for biological treatment of suspensions are, e.g., aerobic or anaerobic processes for biological treatment of waste water, sewage sludge or waste, in which the biodegradable substances contained in the suspension are decomposed by microorganisms.

Processes for biogas recovery are defined below as the anaerobic treatment of suspensions containing biodegradable materials, especially the fermentation of waste or sludge digestion in the treatment of sewage sludge. Here, the biodegradable materials that are also called fermentation media are fermented into biogas in a bioreactor called a fermentation reactor with the exclusion of air. Often mechanical stirring systems or hydraulic recirculation systems are used to thoroughly mix the fermentation medium in the fermentation reactor. Injecting gas into the vicinity of the bottom of the fermentation reactor is also used in various ways.

In so-called loop reactors, a gas is injected into a central guide pipe located within the fermentation reactor, by which the fermentation medium is drawn into the guide pipe. In this way, e.g., the fermentation medium can be conveyed by the guide pipe from the vicinity of the bottom of the fermentation reactor to the surface of the fermentation medium contained in the fermentation reactor. Thus, at least most of the fermentation medium can be circulated in the fermentation reactor. Such a system is described in, e.g., DE 197 25 823 A1. In addition to the important feature that there are no moving parts in the fermentation reactor, this system offers still other advantages. For example, low-gradient, thorough mixing is achieved via the vertical loop. Moreover, the possibility of integrating a heat exchanger into the fermentation By blowing gas into the guide pipe, so-called loop flow forms, which has associated with it some surface surge flow formation and turbulent bottom mixing, where the surface flow is pointed radially outward, by which the formation of surface scum is controlled. As a result of the defined flow conditions near the bottom which provide sediment transport in the direction of the central bottom outlet, finally the formation of sediment deposits commonly is also prevented.

In practical operation, however, it has been shown that for special sludge and waste qualities supplied to the fermentation reactor in a system-specific manner, surface layer and sediment problems can occur that require additional control measures.

Special type of sludges may have a higher content of detergents and fine-fibrous plastic and cellulose particles, which usually result from community waste water treatment or special commercial organic residues, and/or maybe more highly viscous sludges, and/or have solid particles that are larger depending on origin, for example, may contain glass fragments and/or other irregularly shaped inert particles.

For the initial materials, Rotational skimming can take place with collection in the outer area of the fermentation surface in the reactor, where the radially decaying turbulence is no longer sufficient for bottom mixing. For sediments that are dissimilar to sand (rounded quartz grains), entanglement of the particles by their irregular fracture edges can occur; this means increased resistance to hydraulic transport to the center bottom discharge point.

Accordingly, an aspect of the invention is a process and apparatus of the initially mentioned type wherein top scum problems are reliably ameliorated.

Upon further study of the disclosure, other aspects and advantages of this invention will become apparent.

According to a process aspect of a invention, a fluid is passed in the area of the suspension fill level, so that the surface of the suspension and/or the top scum floating on the surface of the suspension is forced into rotary flow. Here, the fluid is fed into the bioreactor via a nozzle, preferably as a free liquid jet.

The basic idea of the invention, therefore, comprises superimposing a hydraulic jet system on the gas-induced loop reactor principle. In this way, the process-engineering advantages of a loop reactor with a guide pipe and gas injection can be used and at the same time problem cases that occur depending on the media are controlled without significantly increasing the addition of energy to the bioreactor system.

A free liquid jet injected into the bioreactor in the area of the suspension fill level causes rotation of the liquid mass near the surface. Rotary flow around the reactor center is formed from liquid jets emerging from nozzles placed substantially tangentially around the periphery of the bioreactor in the area of the fill level.

According to the invention, intensified top scum treatment takes place via a nozzle system that is located near the surface on the periphery of the tank. Here, fluid that is suctioned off from the bioreactor is fed into the bioreactor in part or in a time sequence via at least one nozzle that is provided in the area of the suspension fill level such that the surface of the suspension and/or the top scum floating on the surface of the suspension is forced into rotary flow.

Preferably, the fluid is fed into the bioreactor via nozzles that are located tangentially on the periphery of the tank. Here, advantageously, a portion of the suspension that is suctioned off from the bioreactor is used as a fluid. The nozzles are preferably supplied with fluid at different times. Especially preferably the nozzles are operated with a common pump and successively supplied from the latter by means of cyclic switching.

The top scum and foam particles that accumulate in the vicinity of the periphery of the tank have the tendency to stick together and compact together over time. These particles are preferably therefore continually wetted and/or kept slippery, and are preferably agitated when they compact together. Gas bubbles adhesively adhering to the particles are preferably eliminated in order to reduce buoyancy. Optionally, the particles are deflected into the vicinity of the surface.

Complete control over the entire reactor periphery is not technologically feasible because steel fermentation reactors, for example, are generally not designed for a fill level in the area of the roof slope in terms of strength. Thus, the free liquid surface in such reactors corresponds to the cross-sectional area of the cylindrical part of the reactor.

According to an especially preferred embodiment of the invention, that the top scum, that has been pushed together into a ring by the radial surface flow from the guide zone to the periphery of the tank, is exposed hydraulically to free liquid jets from preferably at least two nozzles located tangentially on the periphery of the tank. These jets force the ring of top scum into rotation by means of transferred pulses caused by the successive cyclic switching of the at least two nozzles. In doing so, the top scum ring runs through the jet zones and is wetted and agitated there in the desired manner.

The top scum outlet attached radially (i.e., rectangular to the inner tank wall on the radius line from wall to tank center) to the inside wall of the tank with a drop pipe, whereby the scum can be removed at the level of the liquid surface, feasibly enables removal of floating material that can no longer be stirred into the suspension. The conditions can be adjusted by a change in the fill level in the bioreactor such that either the top scum rotates over the outlet or the material is pushed into the outlet box in batches.

Preferably a first nozzle is located at a distance in front of the top scum outlet such that it washes the material into the outlet box with sufficient momentum. Preferably, there is a second nozzle opposite the first nozzle and outlet box that provides for movement and wetting. Advantageously, operation of the two nozzles likewise takes place cyclically.

Preferably, the fluid is fed into the bioreactor with a flow velocity of 10 to 15 m/s and a volumetric flow rate of 300 to 600 $m^3$/h.

In other aspects, the reactor according to the invention also contains a biogas recovery system. In yet further aspects, the invention also relates to a device for biological treatment of a suspension with a bioreactor, the interior of which contains a guide means that extends below or into the area of the suspension fill level with a vertical alignment for circulating the suspension.

The apparatus according to the invention comprises at least one nozzle for feeding a fluid into the bioreactor in the area of the suspension fill level.

The nozzle can advantageously be supplied with the suspension via a feed line that is connected to the interior of the bioreactor and via a pump. Preferably, there are several nozzles distributed in the vicinity of the surface on the periphery of the bioreactor, advantageously with a tangential alignment. Here, the nozzles are preferably connected to a common pump. The nozzle advantageously has a diameter of 50 to 120 mm.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The invention will be explained in more detail based on an embodiment that is shown diagrammatically in the figure.

BRIEF DESCRIPTION OF THE DRAWINGS

Various features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE DRAWING

Figure 1:
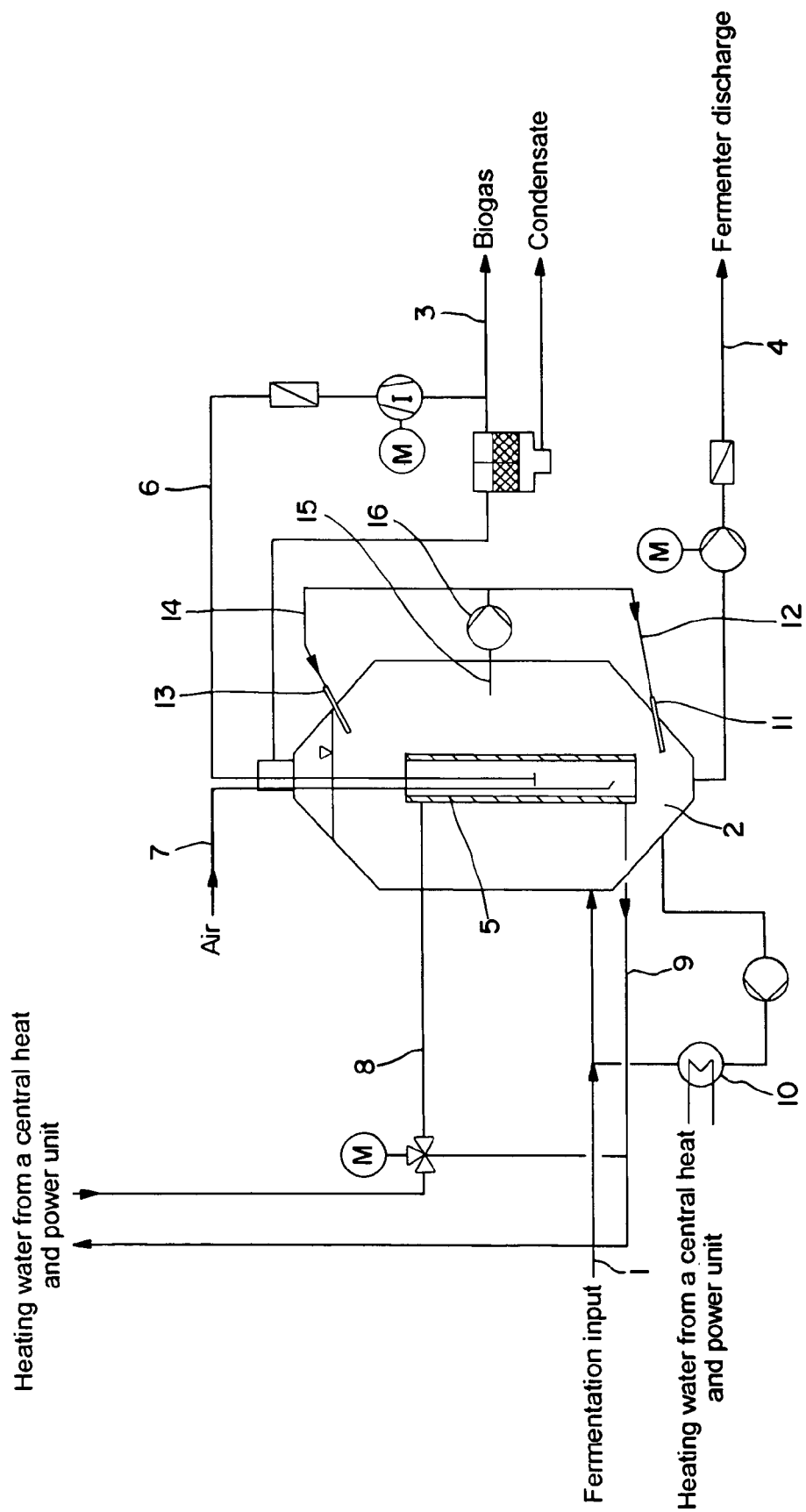
FIG. 1 shows a plant with a bioreactor according to the invention.

FIG. 1 shows a plant for fermentation of wet garbage, for example. The wet garbage is processed in pretreatment steps, not shown in the figure, whereby pulp or hydrolysate is formed. The pulp or hydrolysate is supplied to the bioreactor labeled as the fermentation reactor 2 via a line 1 as a suspension called the fermentation medium. In the fermentation reactor 2, methanation of the pulp or hydrolysate is carried out. To do this, the fermentation reactor 2 is kept under anaerobic conditions, and the contents of the fermentation reactor are circulated. The anaerobic biomass contained in the fermenting pulp and hydrolysate converts the organic substances partially into carbon dioxide and methane. The resulting biogas is drawn off from the fermentation reactor 2 via the line 3.

Since the pulp or hydrolysate also contains sulfur compounds, $H_2S$ would also be formed without further measures and would be found again ultimately in the biogas. In order to minimize the undesirable $H_2S$ portions in the biogas, the entire contents of the fermentation reactor are transported through an oxygen-containing zone with adequate contact time between the oxygen-containing gas and fermentation medium. For this purpose, the fermentation reactor 2 is made as a loop reactor with an inside loop in the form of a centrally and vertically arranged guide pipe 5 that acts as the oxygen-containing zone. Biogas is branched off from the biogas discharge line 3 via the biogas branch line 6 and pumped into the lower part of the interior of the guide pipe for use as a propellant gas. As a result of the decrease in the density of the mixture in the guide pipe 5 and the gas buoyancy force, the fermentation medium is conveyed through guide pipe 5 from bottom to top. In doing so, the hydraulic conditions are set by choosing the guide pipe geometry and the injected biogas flow, such that the entire contents of the fermentation reactor are preferably pumped at least twice per hour through the guide pipe 5. Air is metered into the inner ascending flow of the guide pipe 5 by means of an air feed line 7 in quantitative ratios such that the fermentation medium adequately acquires oxygen contact during passage through the guide pipe 5 in order to limit $H_2S$ formation in the metabolic processes in the desired manner. At the same time, the oxygen is decomposed biochemically to such an extent that there are no longer any oxygen portions that adversely affect the process in the biogas. The air demand can thus be minimized such that the nitrogen in the biogas does not lead to a significant diminishment of gas quality for further caloric use. To maintain an operating temperature that is optimum for biological treatment of the fermentation medium, the guide pipe 5 is made to be heated. To do this, the guide pipe 5, for example, provided with a double-walled jacket that has a feed line 8 and discharge line 9 for the heating water. In addition, the contents of the fermentation reactor can be temperature-treated by means of an outside heat exchanger (not shown) through which heating water flows.

To control the problem cases that occur specific to the media, especially sediment problems that arise for special sludge and waste qualities, a hydraulic jet system is superimposed on the gas-induced loop reactor principle. In this way, the process-engineering advantages of the loop reactor with a guide pipe 5 and gas injection 6 can be used and at the same time problems that arise specific to the media are solved without significantly increasing the addition of energy into the fermentation system. For this purpose, the fermentation medium is drawn off from the fermentation reactor 2 via line 15 and pump 16 and supplied to a nozzle 11 via line 12.

The fermentation medium as a free liquid jet is fed into the fermentation reactor 2 via the nozzle 11 at a nozzle velocity of 10 to 15 m/s and a volumetric flow rate of 300 to 600 m$^3$/h in the area near the bottom. In fermentation reactors with up to 8000 m$^3$ of reaction volume and diameters of up to 24 m, the necessary pulsed flow is produced in this way in order to have the liquid mass near the bottom rotate at roughly 0.3 m/s to 1.0 m/s, preferably, 0.5 m/s near the tank wall. Here, the nozzle 11 that has a diameter of 50 to 120 mm, depending on the tank size and the process parameters, is offset by 40° to 60° to radial flow in order to induce torque. A tilt angle of the nozzle 11 to the horizontal of 0 to 10°, for example, >0 to 10°, compensates for the media-induced buoyancy forces in the jet field. In practice, between two and five nozzles are arranged at corresponding distances on the periphery over the entire fermentation reactor tank circumference, depending on the reactor size. For the sake of clarity, the figure shows only one nozzle 11. All of the installed nozzles can be connected to a single pump, specifically the pump 16, and successively supplied from the latter by means of cyclic switching of the series. This makes possible an efficient and low-maintenance mode of operation.

In order to control top scum problems, a branch line 14 leads from the pump 16 to a nozzle 13 that is located on the fermentation reactor tank circumference near the surface of the suspension. The hydraulic connection of this nozzle 13 takes place via the pump 16 when the on cycles for the top nozzle are such that for each such on cycle one or two additional on cycles can be assigned to the bottom nozzles. When the nozzle 13 is working frequently because of the nature of the media, a separate pump should be preferred. As with the nozzles 11 located in the vicinity of the bottom, it is also recommended that there be several nozzles 13 located near the surface of the suspension. The direction, i.e., the angle(s) in which the nozzles point, of nozzles 13 are preferably set in a similar manner to the direction of nozzles 11. For the sake of clarity, however, only one nozzle 13 is shown in the FIG. 1.

In the above description, the bottom part of the reactor is below the bottom of the guide pipe 5.

Figure 2:
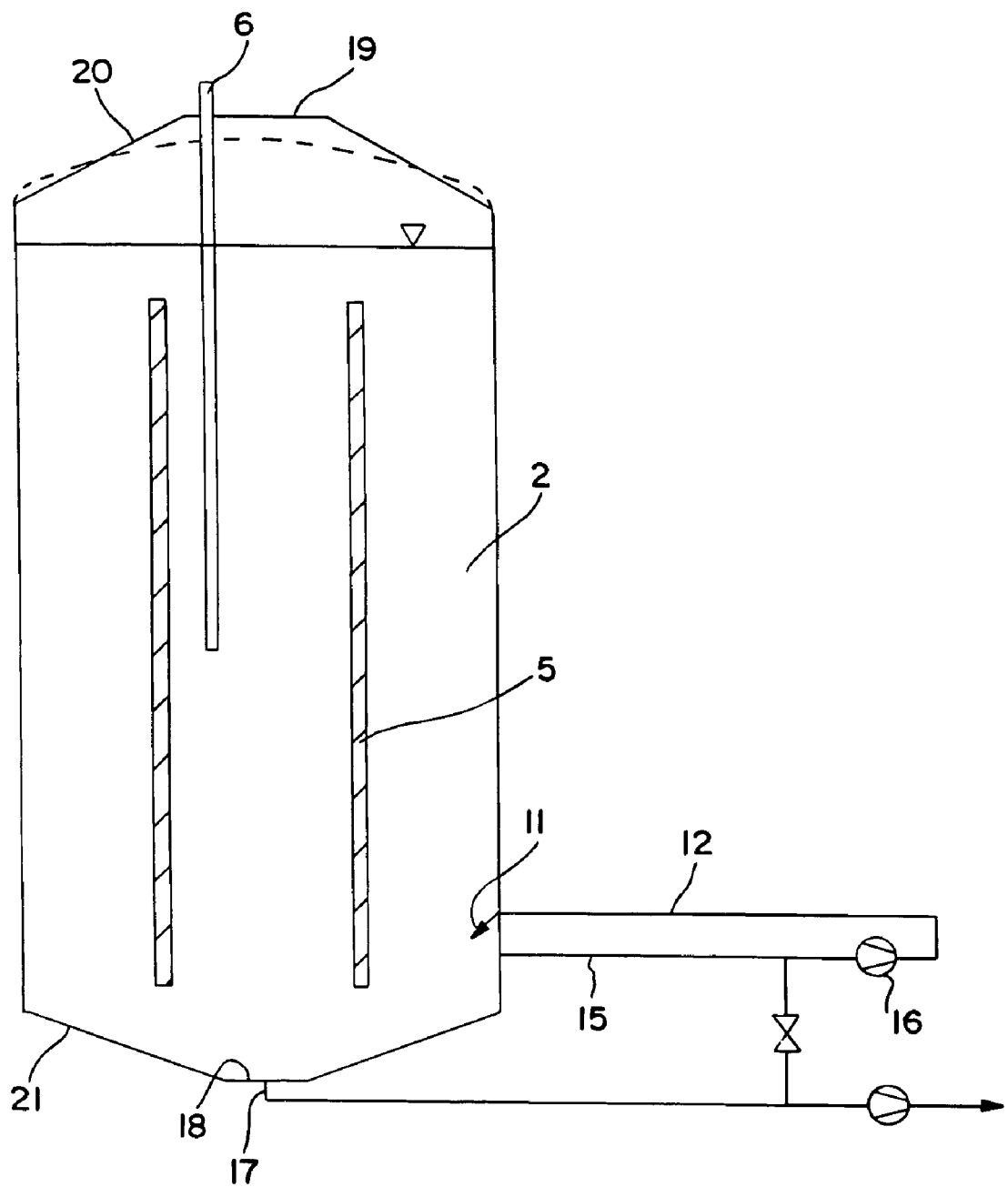
FIG. 2 shows a bioreactor according to the invention.

FIG. 2 illustrates in more detail an embodiment of the fermentation reactor described above. For sake of clarity, the numbers identifying corresponding elements in the figures are numbered identically. This fermentation reactor 2 has forced guidance of sediment and underbody removal.

Forced guidance is achieved by a bottom circulation system that produces horizontal rotary flow in the bottom area of the reactor. As described above, the fermentation medium/material is drawn off from the fermentation reactor via line 15 and pump 16 and supplied to a nozzle 11 via line 12.

To remove sediment, or optionally sediment with fermentation material, e.g., by underbody removal, the reactor contains a central bottom outlet 17. This outlet leads to a pipe which, once in the horizontal direction, is preferably an elbow-free pipe. The pipe crosses under the reactor to carry materials, for example, sediment, out from outlet 17.

The height of the cylindrical portion of the reactor, i.e., not including the top and bottom portions where the diameter narrows, is typically chosen to be 1.1 to 1.3 times more than the reactor's diameter, but is not restricted. For example, the height may be up to 2 times the reactor's diameter for certain applications. The ratio of the diameter of the reactor to the diameter of the guide pipe (5) is typically about 4:1 to 10:1. The bottom of the guide pipe is positioned about 1.0 to 1.5 meters above the central bottom outlet 17. The top of the guide pipe is positioned about 1.0 to 1.5 meters below the minimum level of fermentation material. Pipe 6 through which biogas is charged into the guide pipe may be immersed anywhere from about 6 to 14 meters below the level of fermentation material.

The top and bottom parts of the reactor are structured according to design conditions and are not restricted as illustrated herein. The shape of the top part, for example, can also be a curved top form as illustrated by the dashed line in FIG. 2. The bottom part of the reactor has a central flat floor surface 18. This surface has a diameter that is typically 4 to 8 times less than the diameter of the reactor. The top part of the reactor has a central service platform 19 that has a diameter that is 4 to 8 times less than the reactor's diameter. The sloped portion of the bottom 21, between the central flat floor 18 and the cylindrical portion of the reactor, and the sloped portion of the top 20, between the central service platform 19 and the cylindrical portion of the reactor, respectively, are each, independently, sloped at an angle of 0 to 20°, e.g. >0 to 20°. The bottom portion 21 is preferably integrated with the slope of the concrete floor, which accordingly has a complementary slope of 0 to 80°.

The space or gas volume (gas space) above the liquid in the tank is about 4 to 10% of the liquid volume. The pressure in the gas space is less than or equal to about 100 mbar.

The specific reactor illustrated has a nominal volume of 2376 m$^3$ with a maximum liquid volume of 2231 m$^3$, and is operated such that it has a preferred hydraulic dwell time of 20 days for the fermentation of communal sewage sludge.

In this specific reactor embodiment, the slope of the top part 20 is 12°, and the slope of the bottom part 21 is 10°. The diameter of the cylindrical portion of the reactor is about 13.4 meters. The central pipe has an inner diameter of 2.5 meters and a length of 12.0 meters. Pipe 6 delivering biogas is immersed about 12 meters into the fermentation material. Platform 19 has a diameter of 2.25 meters. The inlet of the bottom circulation system, e.g., to pipe 15, is 0.5 meters, and the outlet of said system, e.g., nozzle 11, is 0.7 meters above the bottom of the cylindrical portion of the fermentation reactor. The centrically flat floor and the centric service platform are each about 1.18 meters above and below, respectively, the cylindrical portion of the reactor. In this embodiment, the level of fluctuation for the fermentation material is about 0.78 meters, with the maximum level being about 0.58 meters below the top of the cylindrical portion of the reactor.

Figure 3:
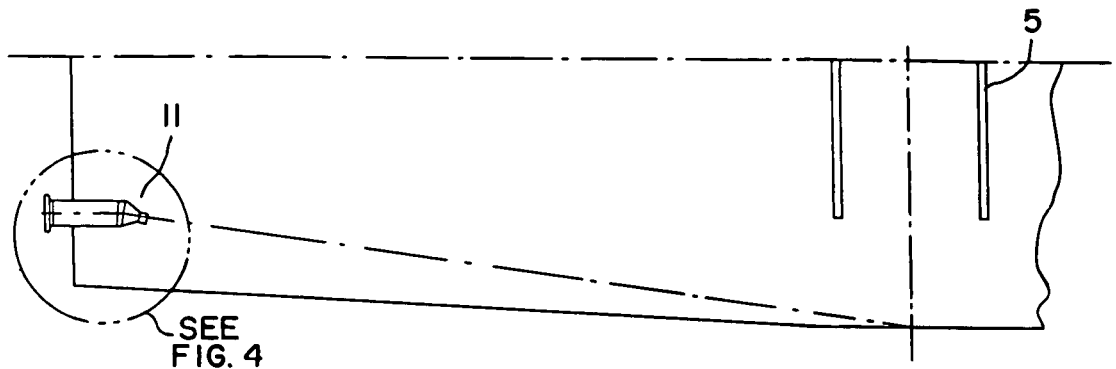
FIG. 3 shows a bottom fluid circulating nozzle viewed from the side.

FIG. 3 illustrates a side view of the bottom circulation system in more detail. The outlet of said system is equipped with nozzle 11 through which material from the fermentation reactor is pumped through to produce a horizontal rotary flow of the material in the reactor. For example, the nozzle in this embodiment produces a force of momentum of 1.0 kN.

Figure 4:
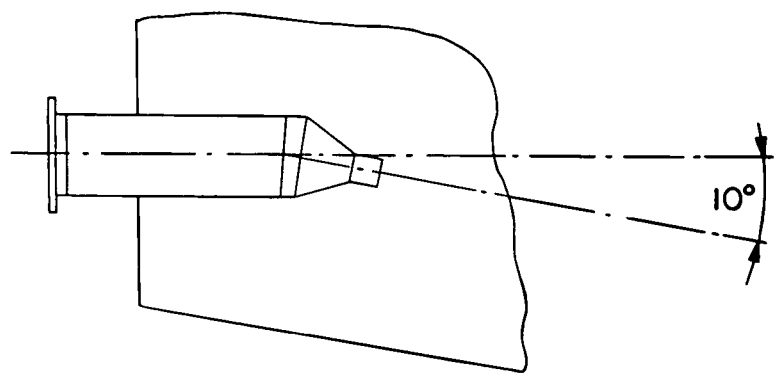
FIG. 4 shows a more detailed illustration of the nozzle from FIG. 3.

FIG. 4 illustrates a more detailed view of a nozzle of the bottom circulation system. In this embodiment, the nozzle is directed at an angle of 10 degrees below horizontal.

Figure 5:
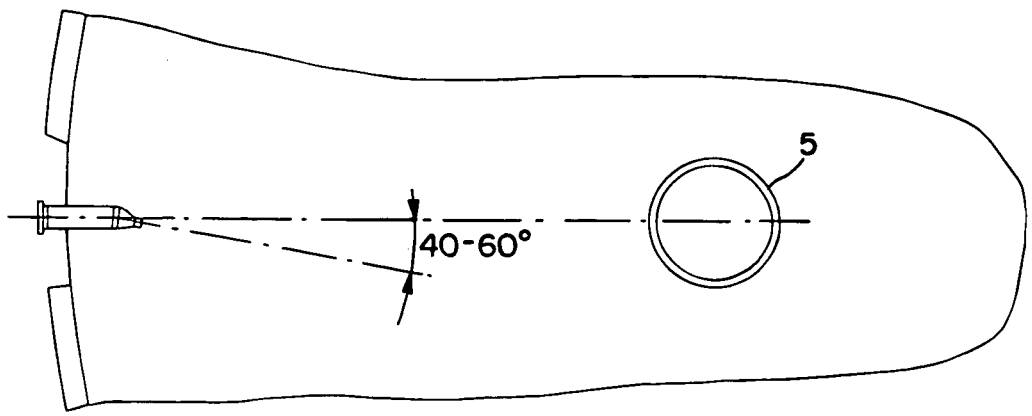
FIG. 5 shows a bottom fluid circulating nozzle viewed from the top.

FIG. 5 illustrates a top view of the bottom circulation system in more detail. The nozzle is directed 40–60 degrees from the radius, i.e., the line from the axis of the guide pipe 5 to the wall of the reactor.

The entire disclosures of all applications, patents and publications, cited herein and of corresponding German Application No. 103 58 400.5 filed on Dec. 23, 2002, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

In the above description, the "area of the suspension fill levels includes the suspension surface and generally some centimeters above and below the surface, for example, above and below 30 or 20 or 10 or 5 or 3 centimeters from the surface, depending on the size of the reactor.

The entire disclosures of all applications, patents and publications, cited herein and of corresponding German Application No. 103 58 399.8 filed on Dec. 23, 2002, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for biological treatment of a suspension in a bioreactor comprising:
   circulating the suspension in the bioreactor by routing at least some of the suspension through a vertically aligned guide zone upward to the area of suspension fill level by injecting gas into the vertically aligned guide zone, whereby a downward flow of at least a portion of the suspension is produced outside of the vertically aligned guide zone, and
   feeding a fluid in the area of the suspension fill level so as to cause rotary flow of the surface of the suspension and/or of the top scum floating on the surface of the suspension.

2. A process according to claim 1, wherein the fluid is fed into the bioreactor via one or more nozzles that are mounted tangentially on the periphery of the bioreactor.

3. A process according to claim 1, wherein the fluid fed to the area of fill level is suspension that is suctioned off from the bioreactor.

4. A process according to claim 2, wherein there are a plurality of nozzles which are supplied with fluid at different times.

5. A process according to claim 2, wherein there are a plurality of nozzles which are operated with a common pump and are successively supplied from the latter by means of cyclic switching.

6. A process according to claim 1, wherein at least a portion of the top scum floating on the surface of the suspension in the rotary flow is removed via at least one top scum outlet on the inside wall of the bioreactor in the area of the suspension fill level.

7. A process according to claim 6, wherein said fluid is fed in the area of the suspension fill level in the vicinity of the top scum outlet and the top scum is washed into the top scum outlet by said feeding of said fluid in the area of the suspension fill level.

8. A piocess according to claim 7, wherein said fluid is also fed to the suspension fill level at a point of the bioreactor periphery which is opposite from the location of said top scum outlet.

9. A process according to claim 7, wherein said fluid is fed via a nozzle provided in the vicinity of the top scum outlet with a momentum such that the top scum is conveyed into the top scum outlet.

10. A process according to claim 1, wherein the fluid is fed with a flow velocity of 10 to 15 m/s.

11. A process according to claim 1, wherein the fluid is fed with a volumetric flow rate of 300 to 600 m$^3$/h.

12. A process according to claim 1, wherein the vertically aligned guide zone is heated.

13. A process according to claim 1, wherein the reactor has a cylindrical portion, a top portion, and a bottom portion, wherein said top and bottom portions narrow in diameter, and the suspension surface is in the cylindrical portion of the bioreactor.

14. A process according to claim 2, wherein the top scum is pushed together into a ring by radial surface flow from the guide zone to the periphery of the bioreactor, and is exposed to free liquid jets from via said one or more nozzles mounted tangentially on the periphery of the bioreactor.

15. A process according to claim 14, wherein at least a portion of the top scum floating on the surface of the suspension is removed via at least one top scum outlet on the inside wall of the bioreactor in the area of the suspension fill level.

16. A process according to claim 1, wherein sediment is removed through a central bottom outlet.

17. A process according to claim 1, wherein the gas injected into the vertically aligned guide zone is biogas that has been recycled to said bioreactor.

18. A process according to claim 1, wherein air is injected into the vertically aligned guide zone.

19. A process according to claim 2, wherein the one or more nozzles are below the suspension surface.

20. A process according to claim 2, wherein the one or more nozzles are 3–30 cm below the suspension surface.

* * * * *

UNITED STATES PATENT AND TRADEMARK OFFICE
CERTIFICATE OF CORRECTION

| | |
|---|---|
| PATENT NO. | : 7,186,335 B2 |
| APPLICATION NO. | : 10/883961 |
| DATED | : March 6, 2007 |
| INVENTOR(S) | : Gerhard Langhans |

It is certified that error appears in the above-identified patent and that said Letters Patent is hereby corrected as shown below:

On The Title Page, Item (63), Related U.S. Application Data reads "Continuation in-part of application No. 10/740,690, filed on Dec. 22, 2003, now abandoned." should read -- This application is a CIP of 10/743,319 12/23/2003 ABN --
On The Title Page, Item (30), Foreign Application Priority Data should read -- Dec. 11, 2003 (DE)....................... 103 58 339.8 --
Column 8, line 15 reads "piocess", should read -- process --

Signed and Sealed this

Thirty-first Day of July, 2007

JON W. DUDAS
*Director of the United States Patent and Trademark Office*